April 5, 1960  E. J. JOHNSTON  2,931,161
RAKE TOOTH MOUNTING
Filed Dec. 12, 1957
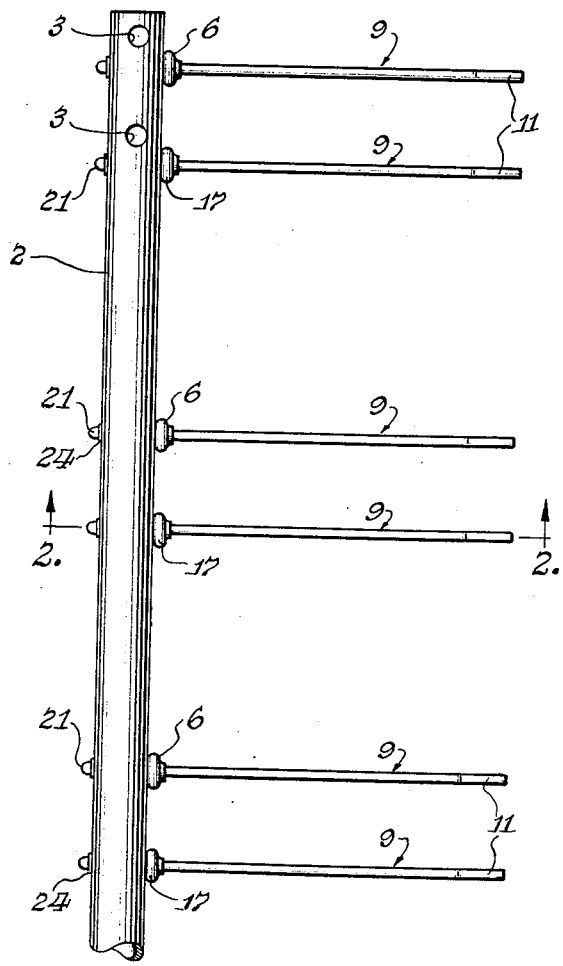
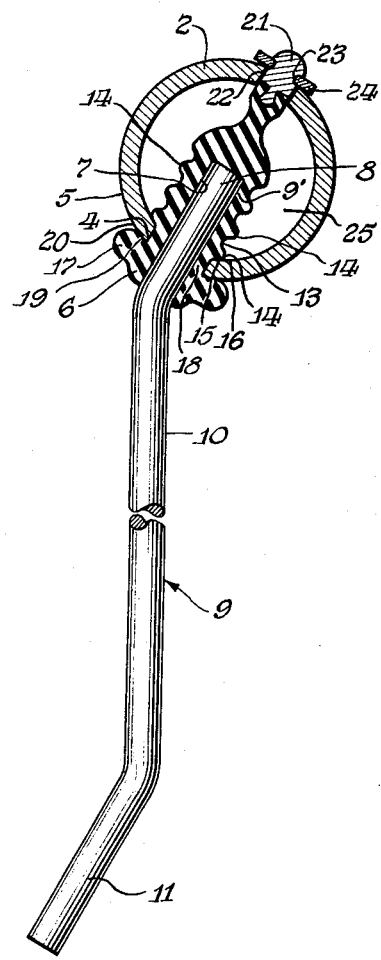
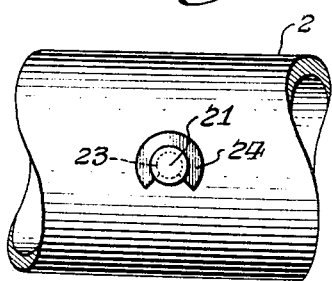
Inventor
Edward J. Johnston
Paul O. Pippel
Attorney United States Patent Office
2,931,161
Patented Apr. 5, 1960

2,931,161

RAKE TOOTH MOUNTING

Edward J. Johnston, Cicero, Ill., assignor to International Harvester Company, Chicago, Ill., a corporation of New Jersey Application December 12, 1957, Serial No. 702,295

4 Claims. (Cl. 56—400)

This invention relates to side delivery rakes and more particularly to mounting of rake teeth on the tooth bars of such rakes.

Side delivery rakes of the type which comprise a rotary reel including tooth bars with a plurality of teeth thereon have always experienced an inordinate amount of tooth breakage at the root ends of the teeth. Various attempts have been made to counteract these failures but with very little success and it is not infrequent to find a rake after only a few hours of operation having a large proportion of the teeth missing. Coil springs have been tried but the placement of such a coil to take care of every condition cannot be accomplished because the loads imposed on the tooth are multidirectional and particularly so in rakes commonly known as parallel bar side delivery rakes where in addition to the normal fore and aft loads and the vertical shocks imposed upon the tooth there is also added the side thrust as the tooth follows the movement of the bar laterally of the advance of the rake.

It is therefore a primary object of the invention to devise a rake tooth and a mounting therefor on the tooth bar which will adequately hold the tooth in operating position and at the same time yield in various directions in order to relieve undue strains on the tooth.

A more specific object of the invention is to provide a novel universal connection for the rake tooth to the tooth bar which is rugged, durable and inexpensive and adaptable for mounting with facility on the rake bar.

A more specific object of the invention is to provide a novel mounting for a tooth bar which includes a rubber mounting member which is suitably vulcanized or attached to one end of a tooth bar, said mounting member being adapted to be readily connected in a suitable aperture in the tooth bar.

These and other objects of the invention will become more apparent from the specification and the drawings, wherein:

Figure 1 is a fragmentary front elevational view of a tooth bar with teeth mounted thereon;

Figure 2 is an enlarged transverse vertical sectional view taken substantially on the line 2—2 of Figure 1; and Figure 3 is an enlarged top view with parts shown in section of the interlock for the tooth mounting member and the rake bar.

Describing the invention in detail and having particular reference to the drawings there is illustrated a conventional tubular tooth bar generally designated 2 which constitutes one of the bars on the four, five or six bar rotary rake reel as will be readily understood by those skilled in the art. The bar 2 has means 3 at each end for connection to an associated mounting member which includes bolts, etc., for connecting the bar through the openings or holes 3 to end member of the reel as well known.

The tooth bar comprises for each tooth a circular opening 4 which is located at the lower extremity of its back side 5 and the opening admits a mounting or plug member 6, which is formed of elastomer materials such as rubber or the like. Member 6 has a central axial opening 7 in which is disposed in a complemental root end portion 8 of the tooth generally indicated 9 which is made of steel or the like. The root end portion 8 is suitably secured to the member 6 within the opening 7 as at 9' by suitable vulcanizing or any other well known process. The tooth has a dependent or vertically extending shank portion 10 which extends downwardly substantially vertically whereas the root end portion extends diagonally upwardly and forwardly from the upper extremity of the shank portion 10 and the tooth further has an outer end 11 which angles rearwardly as well as laterally to prevent hairpinning of material thereon.

The mounting member 6 has a generally cylindrical body portion 13 with a plurality of circumferential outwardly projecting annular rings or ribs 14 and thereabout spaced axially thereof and these rings or ribs are of a size larger than the opening 4 and the lowermost ring 14 has its underside 15 seated against the adjacent portion of the inner periphery 16 of the tube 2. The member 6 is axially stretched between the lowermost rib 14 and the outer annular flange 17 to provide a neck portion 18 which complementally fits within the opening 4 which may be circular although preferably it should be square, oval or otherwise non-round to prevent turning of the member 6.

The ring 17 which is integral with the body portion of the mounting member has its inner side 19 seated against the adjacent portion of the outer periphery 20 of the bar and is of such diameter that it cannot pass even under constant stretching of the member 6 through the opening 4.

The upper end of the body portion 13 merges into an attaching lobe or lug or terminal portion 21 which is substantially smaller in diameter than the body portion 13 and thus more readily stretchable so that it may be readily passed through the upper opening 22 in the bar and then grasped as by a pair of pliers and stretched whereupon the locking horseshoe key 24 may be inserted on top of the bar 2 and slid into the circumferential groove 23 of portion 21, thus completing mounting of the tooth.

In order to mount the tooth on the bar the member 21 is passed through the opening 4 and then the body portion is forced through the opening 4 until the ribs 14 pass through the opening so that the lowermost rib enters within the interior 25 of the bar and the parts assume the position as shown in Figure 2. As the body portion is being inserted into the bar the locking portion 21 will have passed through the opening 22 and project slightly out of the bar. Then the outwardly projecting part of the portion 21 is grasped by a pair of pliers and drawn out to expose the groove 23 so that the horseshoe lock 24 may be inserted into the groove. Then the portion 21 is released and the parts are maintained in tensile engagement. Removal of the clip 24 and withdrawal of the tool with the member 6 from the bar affects disassembly.

Thus a simple and novel and effective universal connection is provided between the tooth and the bar and the locking portion 21 in addition to holding the tooth connected to the bar also serves to resist side thrust on the tooth.

What is claimed is:

1. The combination of a tubular support bar having internal and external peripheral surfaces, a rake tooth having a root end portion extending into the bar through an opening therein to adjacent the center of the bar, a rubber-like mounting member connected to said root end portion and extending into said bar through said opening therein and disposed under compression in said opening between said bar and root portion and having enlarged portions engaging said internal and external surfaces of the bar.

2. The invention according to claim 1 and said mounting member extending diametrically of said bar beyond the tooth and having a securing portion projecting outwardly of said bar through a second opening therein, and means fixing said securing portion to the bar.

3. A rake tooth comprising a root portion, a rubber-like mounting element of substantial thickness sleeved over and connected to the root portion and having an elongated body with at least two axially spaced radially extending enlarged portions defining a part-receiving groove therebetween, said element having an outer end with a relatively thin lug thereon, and said lug having a circumferential groove therein for reception of associated locking means.

4. A support member having spaced portions, one of said portions having an opening therein, a tooth, a tooth-supporting body of elastomer material connected to said tooth and in engagement with said one portion within the opening and having a terminal part in substantial axial alignment with the tooth and anchored to the other portion.

References Cited in the file of this patent

UNITED STATES PATENTS

| | | |
|---|---|---|
| 1,780,748 | Fisher | Nov. 4, 1930 |
| 2,328,121 | Bartek | Aug. 31, 1943 |
| 2,570,852 | Pfistershammer | Oct. 9, 1951 |
| 2,704,150 | Scranton | Mar. 15, 1955 |